United States Patent [19]
Hartung et al.

[11] Patent Number: 6,057,418
[45] Date of Patent: *May 2, 2000

[54] WATER-DILUTABLE POLYESTER

[75] Inventors: Michael Hartung, Geseke; Jörg Budde; Ulrich Poth, both of Münster, all of Germany

[73] Assignee: BASF Coatings AG, Muenster-Hiltrup, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/730,826

[22] Filed: Oct. 10, 1996

[51] Int. Cl.$^7$ .................................................... C08G 63/02
[52] U.S. Cl. .......................... 528/272; 528/302; 528/307; 528/308; 528/308.6
[58] Field of Search ...................................... 528/272, 302, 528/307, 308, 308.6

[56] References Cited

U.S. PATENT DOCUMENTS

| | | | |
|---|---|---|---|
| 5,349,041 | 9/1994 | Blum et al. | 528/85 |
| 5,552,184 | 9/1996 | Klostermann et al. | 427/284 |
| 5,589,228 | 12/1996 | Wegner et al. | 427/407.1 |

*Primary Examiner*—Samuel A. Acquah

[57] ABSTRACT

The present invention relates to a water-dilutable polyester comprising a) at least 25 mol-% of cycloaliphatic structural units, preferably from 30 to 50 mol-%, b) up to 20 mol-% of aromatic structural units, preferably from 10 to 15 mol-%, c) at least 30 mol-%, preferably from 35 to 50 mol-%, of aliphatic diols having a number of carbon atoms $\geq 4$, and d) at least 20 mol-%, preferably from 25 to 40 mol-%, of polyols containing branched aliphatic chains.

9 Claims, No Drawings

WATER-DILUTABLE POLYESTER

The present invention relates to a water-dilutable polyester, to an aqueous coating material containing this polyester, and to its use for the coating of substrates, and also to a process for the coating of substrates, preferably car bodies.

From the prior art it is known to employ free polyisocyanates having certain selected properties (viscosity, hydrophilicity) in combination with various OH-carriers (polyesters, polyurethanes, acrylates) in an aqueous medium for crosslinking under different conditions. Such a system is known, for example, from EP 0 537 568.

Moreover, the prior art discloses aqueous clearcoats based on specific acrylate dispersions and amino resins, optionally in combination with capped polyisocyanates. Examples of these can be found in EP 0 365 775, EP 0 363 723, EP 0 521 926 and EP 0 521 927. However, the coating materials set out therein are unsuitable for low baking temperatures. Processing on plastics components, in particular, is not possible.

The object on which the present invention is based is to provide water-dilutable polymer dispersions from which it is possible to prepare aqueous coating materials which do not have the disadvantages described above. The intention is, in particular, to provide a low-emission clearcoat system which can be processed using the application techniques which are customary in the production-line finishing of automobiles and which can be crosslinked at relatively low temperatures, and is compatible with a wide variety of basecoats. The clearcoat is intended to meet the requirements of the automobile manufacturers for high surface quality (gloss, evenness, fullness and effect), polishability and resistance to chemical agents, atmospheric effects, weathering and mechanical effects, and to be sufficiently elastic and it can also be employed on plastics as substrates.

This object is achieved by a water-dilutable polyester comprising a) at least 25 mol-% of cycloaliphatic structural units, preferably from 30 to 50 mol-%, b) up to 20 mol-% of aromatic structural units, preferably from 10 to 15 mol-%, c) at least 30 mol-%, preferably from 35 to 50 mol-%, of aliphatic diols having a number of carbon atoms $\geq 4$, and d) at least 20 mol-%, preferably from 25 to 40 mol-%, of polyols containing branched aliphatic chains.

Examples of cycloaliphatic structural units which can be employed in accordance with the invention are polycarboxylic acids (hexahydrophthalic acids, 1,4-cyclohexanedicarboxylic acid, 1,3-cyclohexanedicarboxylic acid, tetrahydrophthalic acid, endomethylenetetrahydrophthalic acid, dihydrodicyclopentadienedicarboxylic acid and their derivatives, such as anhydrides or esters with low-molecular mass monoalcohols such as methanol), and polyalcohols (1,4-dimethylolcyclohexane, 1,1-dimethylolcyclohexane, 1,4-cyclohexanediol, 2,2-bis(hydroxymethyl)norbornane, 2,3-bis(hydroxymethyl)norbornane, 2,5-bis(hydroxymethyl)norbornane, 2,6-bis(hydroxymethyl)norbornane).

Examples of aromatic structural units which can be employed are polycarboxylic acids: o-phthalic acid, isophthalic acid, terephthalic acid, trimellitic acid, trimesic acid, pyromellitic acid, naphthalenedicarboxylic acids and their derivatives, such as anhydrides or esters with low-molecular mass monoalcohols such as methanol; and monocarboxylic acids: benzoic acid, para-tert-butylbenzoic acid.

Suitable aliphatic diols are 1,4-butanediol, 1,3-butanediol, 1,6-hexanediol, diethylene glycol, dipropylene glycol, nonanediol and its isomers, 2,2-dimethyl-1,3-propanediol, 2,2-methylpropyl-1,3-propanediol, 2,2-methylbutyl-1,3-propanediol, monoesters of 3-hydroxy-2,2-dimethylpropionic acid and 2,2-dimethyl-1,3-propanediol.

These compounds are also employed as polyols containing branched aliphatic chains.

Particular preference is given to 2,2-dimethyl-1,3-propanediol, 2,2-methylpropyl-1,3-propanediol, monoesters of 3-hydroxy-2,2-dimethylpropionic acid and 2,2-dimethyl-1,3-propanediol.

The acid numbers of the polyesters are preferably from 20 to 100, particularly preferably from 25 to 55, the acid group being formed from an at least trifunctional polycarboxylic acid or hydroxycarboxylic acid in such a way that, on the average, the functional groups of the polycarboxylic acid or of the hydroxycarboxylic acid, except for one carboxylic group, have been reacted to become part of the polyester molecule. Put another way, on average, the functional groups of the polycarboxylic acid or of the hydroxycarboxylic acid are reacted until there is one carboxyl group left in the polyester molecule (TMA diester, DMPA diester).

It is preferred to employ diesters of trimellitic acid, trimesic acid, triesters of pyromellitic acid, which are incorporated with the abovementioned diols in the polyester composite structure; diesters of 2,2-dimethylolpropionic acid.

Preferred OH numbers are from 90 to 200, particularly preferably from 100 to 150.

The novel polyesters have molar masses of from 800 to 3,000, particularly preferably from 1,200 to 2,000, stated as numerical average calculated from the molar composition and the degree of condensation. The polyester has from 0.5 to 1.8 mol, preferably from 0.6 to 1.2 mol, of branching sites per 1000 g of polyester, calculated without the lateral COOH groups.

Correspondingly, as polyols it is possible to employ glycerol, trimethylolpropane, trimethylolethane, trishydroxyethyl isocyanurate. The preferred polycarboxylic esters are triesters of trimellitic acid or trimesic acid with the abovementioned diols, and the corresponding tetraesters of pyromellitic acid.

The water-dilutable polyesters provided in accordance with the invention can be prepared by esterifying the structural units of the polyesters in the melt at elevated temperatures. In this context it is preferred to employ a two-stage esterification process. The reactors customary for condensation reactions are employed.

The novel water-dilutable polyesters can be used to prepare aqueous coating materials. The aqueous coating materials containing the novel polyester dispersions comprise, as crosslinking agent, a polyisocyanate. Oligomeric polyisocyanates are particularly suitable for this purpose.

Examples of such isocyanates are the isocyanurate trimer of hexamethylene diisocyanate, the biuret trimer of hexamethylene diisocyanate, the dimeric allophanate of hexamethylene diisocyanate and a monoalcohol, the corresponding compounds of isophorone diisocyanate, mixtures of these compounds, modifications of these compounds with polyethers and/or uretdiones or carbodiimides (of these, products are available on the market).

The crosslinking ratio of moles of free NCO groups relative to the moles of the OH groups of the polyester is from 0.9 to 1.6, preferably from 1.0 to 1.3.

The mixtures of the following substances of the clearcoat and of the crosslinking agents, or the crosslinking-agent solution, can be supplied as separate components and are to be suitably combined prior to processing, either by stirring them in manually, by means of mechanical stirring equipment or in two-component application units, with the mixture of the remaining constituents, and this combination can be applied to optimum effect, following these simple mixing techniques, over a period of max. 3 hours.

Use is preferably made of not more than 35%, based on the nonvolatile constituents of the overall system, of at least partially water-miscible cosolvents from the group consisting of esters, glycol ethers and/or glycol ether esters (the esters are characterized in that the carbon chains contain at least one tertiary carbon atom), pyrrolidones, amides; at least 50% of the quantity of the cosolvents is non-protic and is employed to prepare the solution of the polyisocyanate oligomer and, if desired, in the process of the preparation of the secondary dispersion of the polyester.

Examples are ethylene, diethylene, propylene and dipropylene glycol monoethers of methanol, ethanol, n-propanol, isopropanol, n-butanol, tert-butanol, hexanol, and of 2-ethylhexanol and the ethers of relatively high-molecular mass polyethers of these polyols, esters of said polyol monoethers with isobutyric acid, esters of said propylene glycol monoethers and their higher derivatives with acetic acid, propionic acid, isobutyric acid, 3-methoxybutanol and its esters, N-methylpyrrolidone, N,N-dimethylformamide, N,N-dimethylacetamide.

The aqueous coating material additionally contains neutralizing agents. Preference is given to from 0.6 to 1.2 mol, based on the free carboxyl groups of the polyester, of amines as neutralizing agents. From 0.9 to 1.1 mol/COOH are particularly preferred.

Examples to be mentioned are N,N-dimethylethanolamine, N,N-diethylethanolamine, N-methylmorpholine, triethylamine, triethanolamine, diisopropylamine, 2-amino-2-methylpropanol.

The novel coating materials may additionally contain catalysts. If desired, not more than 0.3%, based on the non-volatile constituents of the overall system, of catalysts for the isocyanate crosslinking (relatively non-volatile tertiary amines or organic tin compounds), is present.

In addition to this it is also possible for there to be customary light stabilizer combinations comprising up to 2%, based on the non-volatile constituents, of UV-absorbers from the group consisting of benzotriazoles, triazines, oxanilides or mixtures thereof and up to 1.5%, based on the non-volatile constituents, of HALS from the group consisting of the N-substituted 2,6-dialkylpiperidines.

Examples of light stabilizers are UV-absorbers (benzotriazoles, triazines, oxanilides). Free-radical scavengers are sterically hindered amines: N-substituted 2,6-dialkylpiperidines.

Light stabilizers of this kind are customary constituents for clearcoats. Commercial products can be obtained, inter alia, from the companies Ciba (Tinuvin), Sandoz (Sandovur), Cytec (Cyaguard).

In addition to the above-described polyesters it is also possible for the coating materials to contain additional binder components, which are intended to support the application characteristics, such as secondary or primary acrylate dispersions, polyurethane dispersions or water-dilutable alkyd resins.

It is additionally possible, if desired, for there to be up to max. 5%, based on the non-volatile constituents of the system, of non-volatile polyethers (PE, PG, mixtures and copolyethers).

Finally, it is possible to use water-compatible additives which are customary for the novel coating materials, such as leveling agents, antifoams, rheology agents, surface agents.

Examples of leveling agents which can be employed are polyacrylates of aliphatic acrylic esters and modified polysiloxanes. Examples of antifoams are tetramethylhexanediol and fluorinated alkyl esters; rheology agents which can be employed are polyacrylic acids. As surface agents which can be employed, modified polysiloxanes are to be mentioned.

Depending on the intended use of the coating materials prepared from the water-dilutable polyester dispersions provided in accordance with the invention, the coating materials may comprise a large number of further additives necessary for the particular intended application.

The aqueous coating materials comprising as binder the polymerization product present in the water-dilutable polyesters provided in accordance with the invention are particularly suitable for the preparation of aqueous coating materials which are suitable for the finishing of car bodies. They can be used in processes for the coating of car bodies, in which an electrodeposition coat, a filler coat and a pigmented coat and a transparent topcoat are applied over one another and are baked in succession in a plurality of baking steps. From the water-dilutable polyester dispersions provided in accordance with the invention it is possible, in particular, to prepare transparent aqueous coating materials which are especially suitable for preparing the transparent topcoat in the above-described process for the coating of car bodies.

The advantage of the transparent coating materials is that they are suitable, in the context of the application over various basecoats without impairing the effect in the wet-on-wet technique (i.e. with only slight pre-drying at room temperature or in an IRR predryer in the case of water-based coating materials), for conjoint baking of the basecoat and clearcoat at temperatures of from 60 to 130° C. for the sector of automotive production-line finishing. In particular, the coating materials can also be used for the coating of plastics substrates.

When the water-dilutable polyesters according to the invention have been used, a ready incorporability of the crosslinking agents has surprisingly resulted. This is associated with the possibility of using a wide variety of crosslinking agents at the same time.

The aqueous coating materials prepared using the novel polyesters are distinguished by favorable processing properties. They are particularly suitable for spray application over predried basecoat of a wide variety of types on water-based coating materials.

Although the preferred area of use is use in clearcoats, pigmented coating materials can also be prepared using the novel polyesters. Accordingly, the novel coating materials can be employed for the coating of car bodies for which an electrodeposition coat, a filler coat and a single-layer pigmented topcoat, or a two-coat topcoat system consisting of a pigmented basecoat and a transparent topcoat, are applied over one another and are baked in succession in a plurality of baking steps, for the preparation of the filler coat, of the single-layer pigmented topcoat, of the pigmented basecoat or of the transparent topcoat.

In the text below, the invention is described in more detail with reference to the examples:

EXAMPLES

1. Water-dilutable Polyester 175 g of 1,1,1-trimethylolpropane, 308 g of 1,6-hexanediol, 1064 g of neopentylglycol hydroxypivalate (monoester of 3-hydroxy-2,2-dimethylpropionic acid and 2,2-dimethyl-1,3-propanediol), 703 g of hexahydrophthalic anhydride and 50 g of xylene as entraining agent are weighed into a stainless-steel reaction vessel with a volume of 4 l which is equipped with an anchor stirrer, a thermometer, a feed line for inert gas, with a packed column and a measurement point for the overhead temperature for the column, with a condenser following the column and with a water separator full of xylene as receiver, which is constructed such that excess entraining agent is able to run back to the column head. The content of the reactor is heated rapidly to 150° C. with stirring and with the introduction of nitrogen as inert gas. From 150° C., the temperature in the reactor is raised to a maximum of 220° C. in such a way that the temperature at the head of the column does not exceed 103° C. and the returning entraining agent ensures exchange of material in the column. The water of reaction which is produced in this procedure is regularly taken off. The reaction mixture is maintained at 220° C. until the contents of the reactor have reached an acid number of 14.1. The reaction mixture is then cooled to below 160° C., and subsequently 375 g of trimellitic anhydride are added. The reactor is changed over from the packed column to an overflow tube and the reaction mixture is carefully heated at not more than 180° C. in order to add on the trimellitic acid to the excess OH groups of the first polyester stage and to esterify statistically at least one further COOH group. The reaction mixture is held at 180° C. for this purpose, and condensation is carried out until an acid number of 35.4 and a viscosity of the polyester, in a measurement solution of the reaction mixture of 50% in ethylene glycol mono-n-butyl ester of 140 mPa.s, measured in an ICI plate-cone viscometer at 23° C., is reached. The reaction product is then rapidly cooled below 120° C. and diluted with 750 g of 1-methoxypropyl 2-acetate, and then 127 g of triethylamine are added and the resulting solution is run into 623 g of deionized water, heated at 60° C., and is stirred into this water. The resulting product consists of a slightly opaque, viscous solution and contains 61.3% by weight of polyester (measured as non-volatile fraction on a sample in a convection oven for 60 minutes at 130° C.) having an acid number of 33.5 mg of KOH/g, a molar mass (numerical average calculated from the formulation and from the acid number) of 1161 and a degree of branching of 1.30; 3.0% by weight of triethylamine (0.8 mol/COOH groups of the polyester); 20.0% by weight of 1-methoxypropyl 2-acetate and 15.7% by weight of deionized water. The product is dilutable in water and is employed in a clearcoat formulation.

2. Preparation of a Novel Aqueous Clearcoat

The following quantities are added, using a high-speed stirrer, to 540 g of the novel binder:

20 g of ethyldiglycol 10 g of commercial antifoams 5 g of dimethylethanolamine 25 g of commercial UV absorber 10 g of commercial HALS free-radical scavenger 380 g of deionized water 3. Pneumatic Coating of Plastics Components Panels or fittings made from polycarbonate blends are washed with isopropanol and dried. A flow-cup gun is used to apply a commercial 2-component polyurethane primer for plastics and the coated plastic components are appropriate dried for 30 minutes at 80° C. Then a commercial metallic finish is applied. The dry-film thickness of the primer and of the basecoat is 30 and 15 $\mu$m respectively.

After 5 minutes of drying, the novel aqueous clearcoat is applied. This clearcoat is mixed thoroughly, using a high-speed stirrer, with an isocyanate hardener (e.g. 20 parts of Desmodur N3300). Then 20 parts of deionized water are stirred in. The novel aqueous clearcoat is applied by means of a flow-cup gun (spray pressure 4–5 bar, 1.2 mm nozzle) in 2 cross-passes so as to give a dry-film thickness of from 25 to 30 $\mu$m. After a flash-off time of 15 minutes at 90° C., the coated plastics component is dried for 30 minutes in a convection oven.

Technological Tests

The coated components are aged at room temperature for 7 days. The following test results are obtained:

Crosshatch with Tesa tear-off (DIN 53151): Value 0

VW steam jet test: satisfactory (no flaking)

VW stone chipping: 0 (no flaking)

Blisters after 240 h constant climate: m0/g0

Adhesion after 240 h constant climate: Value 0

We claim:

1. A water-dilutable polyester comprising a) at least 25 mol-% of cycloaliphatic structural units, b) from 10 to 15 mol-% of aromatic structural units, c) at least 30 mol-% of aliphatic diols having a number of carbon atoms $\geq 4$, and d) at least 20 mol-% of polyols containing branched aliphatic chains, wherein said water dilutable polyester has at least one carboxyl group.

2. A water-dilutable polyester as claimed in claim 1, having an acid number between 20 and 100 mg of KOH/g and an OH number between 90 and 200 mg of KOH/g.

3. A water-dilutable polyester as claimed in claim 2, having an acid group formed from at least a trifunctional polycarboxylic acid or hydroxycarboxylic acid.

4. A water-dilutable polyester as claimed in claim 1, having a degree of branching from 0.5 to 1.8 mol/1000 g of polyester, calculated without the lateral COOH groups.

5. A water-dilutable polyester as claimed in claim 1, having a molar mass between 800 and 3000.

6. A water-dilutable polyester comprising a) from 30 to 50 mol-% of cycloaliphatic structural units, b) from 10 to 15 mol-% of aromatic structural units, c) from 35 to 50 mol-% of aliphatic diols having a number of carbon atoms $\geq 4$, and d) from 25 to 40 mol-% of polyols containing branched aliphatic chains, wherein said water dilutable polyester has at least one carboxyl group.

7. A water-dilutable polyester as claimed in claim 2, wherein the acid number is between 25 and 55 mg of KOH/g and the OH number is between 90 and 200 mg of KOH/g.

8. A water-dilutable polyester as claimed in claim 4, wherein the degree of branching is from 0.6 to 1.2 mol/1000 g of polyester, calculated without the lateral COOH groups.

9. A water-dilutable polyester as claimed in claim 5, wherein the molar mass is between 1,200 and 2000.

* * * * *